(12) United States Patent
Xu et al.

(10) Patent No.: US 12,151,614 B2
(45) Date of Patent: Nov. 26, 2024

(54) HITCH ASSISTANCE SYSTEM WITH INTERFACE PRESENTING SIMPLIFIED PATH IMAGE

(71) Applicant: Ford Global Technologies, LLC, Dearborn, MI (US)

(72) Inventors: Li Xu, Northville, MI (US); Kyle Simmons, New Boston, MI (US); Shannon Brooks-Lehnert, Ann Arbor, MI (US); Katherine Rouen, Livonia, MI (US); Roger Arnold Trombley, Ann Arbor, MI (US); Bo Bao, Canton, MI (US); Seyed Armin Raeis Hosseiny, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 18/101,238

(22) Filed: Jan. 25, 2023

(65) Prior Publication Data
US 2023/0158845 A1    May 25, 2023

Related U.S. Application Data

(63) Continuation of application No. 16/196,487, filed on Nov. 20, 2018, now Pat. No. 11,590,815.

(51) Int. Cl.
*B60R 1/00* (2022.01)
*B60D 1/36* (2006.01)
(Continued)

(52) U.S. Cl.
CPC ............ *B60R 1/003* (2013.01); *B60D 1/36* (2013.01); *B60D 1/363* (2013.01); *B60R 1/00* (2013.01);
(Continued)

(58) Field of Classification Search
CPC .......... G05D 1/00; G05D 1/0246; B60R 1/00; B60R 1/003; B60D 1/06; B60D 1/36;
(Continued)

(56) References Cited

U.S. PATENT DOCUMENTS 5,471,393 A    11/1995  Bolger
8,126,642 B2    2/2012  Trepagnier et al.
(Continued)

FOREIGN PATENT DOCUMENTS

DE    102004043761 A1    3/2006
DE    102012001380 A1    8/2012

OTHER PUBLICATIONS

NPL Search (Feb. 15, 2024).*
NPL Search (Feb. 8, 2022).

*Primary Examiner* — Van T Trieu
(74) *Attorney, Agent, or Firm* — Lorne Forsythe; Price Heneveld LLP

(57) ABSTRACT

A vehicle hitching assistance system includes a controller acquiring image data from the vehicle and deriving a vehicle path to align a center of a hitch ball of the vehicle with a centerline of a trailer coupler within the image data. The controller also outputs a video image including a representation of a simplified path from the hitch ball to the coupler and outputs a steering signal to cause the vehicle to steer along the vehicle path.

20 Claims, 15 Drawing Sheets

(51) Int. Cl.
  *B60D 1/06*   (2006.01)
  *B60D 1/62*   (2006.01)
  *B60D 1/64*   (2006.01)
  *B60R 1/26*   (2022.01)
  *B60R 11/04*  (2006.01)

(52) U.S. Cl.
  CPC ............... *B60D 1/065* (2013.01); *B60D 1/62* (2013.01); *B60D 1/64* (2013.01); *B60R 1/26* (2022.01); *B60R 11/04* (2013.01); *B60R 2300/808* (2013.01)

(58) Field of Classification Search
  CPC .... B62D 15/02; B62D 15/025; B62D 15/028; B62D 15/029
  See application file for complete search history.

(56) References Cited

U.S. PATENT DOCUMENTS

| | | |
|---|---|---|
| 2015/0115571 A1 | 4/2015 | Zhang et al. |
| 2016/0023601 A1 | 1/2016 | Windeler |
| 2017/0073004 A1* | 3/2017 | Shepard ............... B62D 15/028 |
| 2017/0313351 A1 | 11/2017 | Lavoie |
| 2018/0037261 A1* | 2/2018 | Shepard ................ B60D 1/62 |
| 2018/0147900 A1 | 5/2018 | Shank |
| 2018/0208241 A1 | 7/2018 | Shepard |
| 2019/0172218 A1 | 6/2019 | Maruoka |
| 2019/0283803 A1 | 9/2019 | Auner |
| 2020/0110402 A1* | 4/2020 | Golgiri ............... G05D 1/0016 |

* cited by examiner

HITCH ASSISTANCE SYSTEM WITH INTERFACE PRESENTING SIMPLIFIED PATH IMAGE

CROSS-REFERENCE TO RELATED APPLICATIONS

The patent application is a continuation of and claims priority to U.S. patent application Ser. No. 16/196,487, filed on Nov. 20, 2018, now U.S. Pat. No. 11,590,815, entitled "HITCH SYSTEM WITH INTERFACE PRESENTING SIMPLIFIED PATH IMAGE", the entire disclosure of which is incorporated herein by reference in its entirety.

FIELD OF THE INVENTION

The present invention generally relates to a vehicle hitch assistance system. In particular, the system provides presents a simplified travel path as a static image to a user, with such image being updated according to predetermined parameters.

BACKGROUND OF THE INVENTION

Hitching a trailer to a vehicle can be a difficult and time-consuming experience. In particular, aligning a vehicle hitch ball with the desired trailer hitch can, depending on the initial location of the trailer relative to the vehicle, require repeated forward and reverse driving coordinated with multiple steering maneuvers to appropriately position the vehicle. Further, through a significant portion of the driving needed for appropriate hitch ball alignment, the trailer hitch cannot be seen, and the hitch ball can, under ordinary circumstance, never actually be seen by the driver. This lack of sight lines requires inference of the positioning of the hitch ball and hitch based on experience with a particular vehicle and trailer, and can still require multiple instances of stopping and stepping out of the vehicle to confirm alignment or to note an appropriate correction for a subsequent set of maneuvers. Even further, the closeness of the hitch ball to the rear bumper of the vehicle means that any overshoot can cause a collision of the vehicle with the trailer. Accordingly, further advancements may be desired.

SUMMARY OF THE INVENTION

According to one aspect of the disclosure, a vehicle hitching assistance system includes a controller acquiring image data from the vehicle and deriving a vehicle path to align a center of a hitch ball of the vehicle with a centerline of a trailer coupler within the image data. The controller also outputs a video image including a representation of a simplified path from the hitch ball to the coupler and outputs a steering signal to cause the vehicle to steer along the vehicle path.

Embodiments of the first aspect of the disclosure can include any one or a combination of the following features or aspects:
  the vehicle path includes a set of path segments defining respective curvatures in opposite directions, and the simplified path includes only one segment having a curvature in a single direction; the simplified path is selected from the path segments set based on a theoretical turn radius at the hitch ball;
  the simplified path is derived as an arced path between a current hitch ball position and a current coupler position;
  the arced path is defined by a backing trajectory of the hitch ball that is centered about a theoretical turn center of the vehicle for a theoretical constant turn radius;
  the simplified path is derived as a straight line path between a current hitch ball position and a current coupler position;
  the video image output by the controller further includes at least a portion of the image data with the representation of the simplified path overlaid on the image data, and the video image is output to a human-machine interface within the vehicle for display thereon;
  the controller further derives the simplified path at an initial state and updates the simplified path at least one subsequent state, wherein the representation of the simplified path included in the video image corresponds with a most recent state;
  the simplified path derived at the initial state is an arced path, and the simplified path derived at the at least one subsequent state is a straight line path;
  wherein the controller acquires the image data from an imaging system included with the vehicle, the imaging system having at least one camera; and
  the controller outputs the steering signal to a steering system included with the vehicle, and the controller derives the steering signal based on at least a maximum steering angle of the steering system.

According to another aspect of the disclosure, a vehicle includes a steering system and a controller. The controller acquires image data from the vehicle and derives a vehicle path to align a center of a hitch ball of the vehicle with a centerline of a trailer coupler within the image data. The controller further outputs a video image including a representation of a simplified path from the hitch ball to the coupler and outputs a steering signal to the steering system to steer along the vehicle path.

According to another aspect of the disclosure, a method for assisting a vehicle in hitching with a trailer includes acquiring image data from the vehicle, deriving a vehicle path to align a center of a hitch ball of the vehicle with a centerline of a trailer coupler within the image data, presenting a video image including a representation of a simplified path from the hitch ball to the coupler, and causing the vehicle to steer along the vehicle path.

According to another aspect of the disclosure, a vehicle hitching assistance system includes a human-machine interface including a video screen; and a controller acquiring image data from the vehicle. The controller further derives a vehicle path to align a hitch ball of the vehicle with a trailer coupler within the image data, the vehicle path including a set of path segments defining respective curvatures in opposite directions, outputs a video image, including a representation of a simplified path from the hitch ball to the coupler, to the video screen for display thereon, the simplified path including only one segment selected from the path segment set, and outputs a steering signal to cause the vehicle to steer along the vehicle path.

According to another aspect of the disclosure, a vehicle, includes a steering system, a human-machine interface including a video screen, a controller. The controller acquires image data from the vehicle, derives a vehicle path to align a hitch ball of the vehicle with a trailer coupler within the image data, derives a simplified path from the hitch ball to the coupler at an initial state, and outputs a video image, including a representation of a simplified path, to the video screen for display thereon. The controller further outputs a steering signal to the steering system to steer along the vehicle path and updates the simplified path in at least one subsequent state while steering along the vehicle path. The representation of the simplified path included in the video image corresponds with a most recent state, at least by having an updated curvature that is different from an initial curvature corresponding with the initial state.

According to another aspect of the disclosure, a method for assisting a vehicle in hitching with a trailer includes acquiring image data from the vehicle, deriving a vehicle path to align a hitch ball of the vehicle with a trailer coupler within the image data, deriving a simplified path from the hitch ball to the coupler at an initial state, and outputting a video image, including a representation of a simplified path, to the video screen for display thereon. The method further includes causing the vehicle to steer along the vehicle path and updating the simplified path in at least one subsequent state while causing the vehicle to steer along the vehicle path. The representation of the simplified path included in the video image corresponds with a most recent state, at least by having an updated curvature that is different from an initial curvature corresponding with the initial state.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
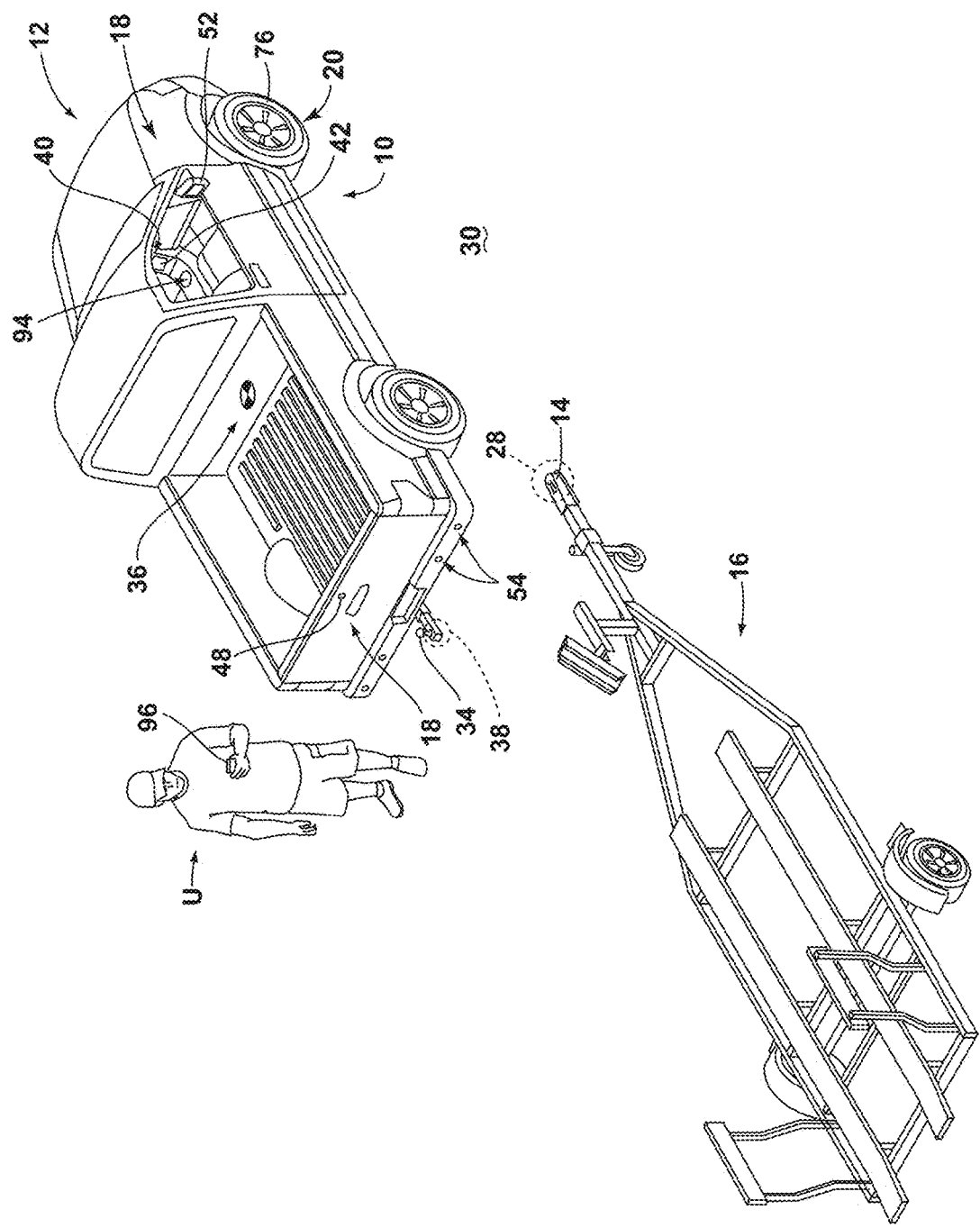
FIG. 1 is a perspective view of a vehicle in an unhitched position relative to a trailer.

For purposes of description herein, the terms "upper," "lower," "right," "left," "rear," "front," "vertical," "horizontal," "interior," "exterior," and derivatives thereof shall relate to the device as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring generally to FIGS. 1-10, reference numeral 10 designates a hitch assistance system (also referred to as a "hitch assist" system) for a vehicle 12. The system 10 includes a controller 26 acquiring image data 55 from the vehicle 12 and deriving a vehicle path 32 to align a hitch ball 34 of the vehicle 12 with a trailer coupler 14 within the image data 55. The controller 26 also outputs a video image 43 including a representation of a simplified path 86 from the hitch ball 34 to the coupler 14 and outputs a steering signal to cause the vehicle 12 to steer along the vehicle path 32.

Figure 2:
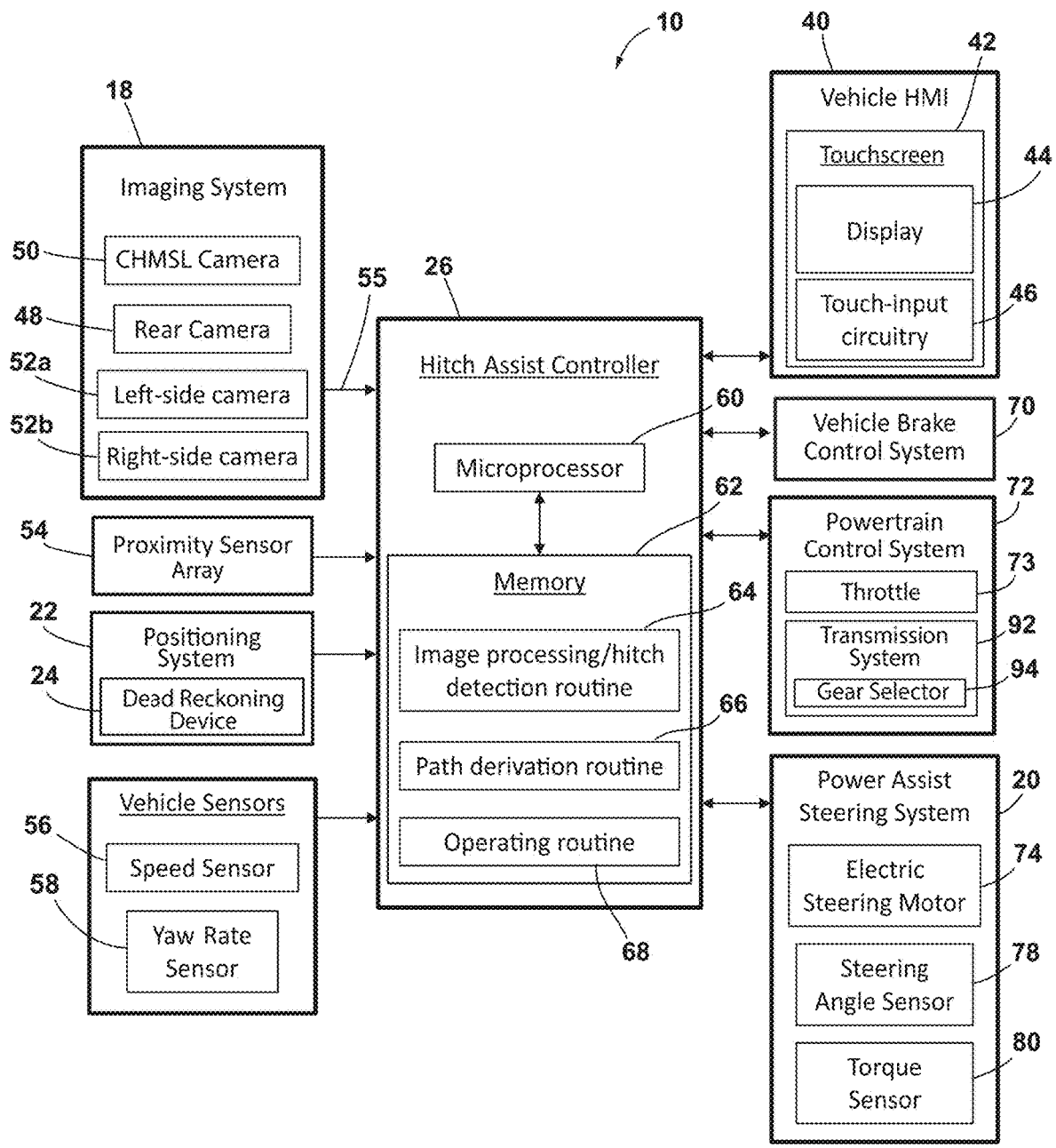
FIG. 2 is a diagram of a system according to an aspect of the disclosure for assisting in aligning the vehicle with a trailer in a position for hitching the trailer to the vehicle by movement along a path, with a schematic depiction of a simplified path for presentation to a user.

With respect to the general operation of the hitch assist system 10, as illustrated in the system diagram of FIG. 2, system 10 includes various sensors and devices that obtain or otherwise provide vehicle status-related information. This information includes positioning information from a positioning system 22, which may include a dead reckoning device 24 or, in addition or as an alternative, a global positioning system (GPS), to determine a coordinate location of the vehicle 12 based on the one or more locations of the devices within the positioning system 22. In particular, the dead reckoning device 24 can establish and track the coordinate location of the vehicle 12 within a localized coordinate system 82 based at least on vehicle speed and steering angle S. Other vehicle information received by hitch assist system 10 may include a speed of the vehicle 12 from a speed sensor 56 and a yaw rate of the vehicle 12 from a yaw rate sensor 58. It is contemplated that in additional embodiments, a proximity sensor 54 or an array thereof, and other vehicle sensors and devices may provide sensor signals or other information, such as sequential images of a trailer 16, including the detected coupler 14, that the controller 26 of the hitch assist system 10 may process with various routines to determine the height H and position of coupler 14.

As further shown in FIG. 2, one embodiment of the hitch assist system 10 is in communication with the steering system 20 of vehicle 12, which may be a power assist steering system 20 including an electric steering motor 74 to operate the steered wheels 76 (FIG. 1) of the vehicle 12 for moving the vehicle 12 in such a manner that the vehicle yaw changes with the vehicle velocity and the steering angle S. In the illustrated embodiment, the power assist steering system 20 is an electric power-assisted steering ("EPAS") system including electric steering motor 74 for turning the steered wheels 76 to a steering angle δ based on a steering command, whereby the steering angle δ may be sensed by a steering angle sensor 78 of the power assist steering system 20. The steering command may be provided by the hitch assist system 10 for autonomously steering during a trailer hitch alignment maneuver and may alternatively be provided manually via a rotational position (e.g., steering wheel angle) of a steering wheel of vehicle 12. However, in the illustrated embodiment, the steering wheel of the vehicle 12 is mechanically coupled with the steered wheels 76 of the vehicle 12, such that the steering wheel moves in concert with steered wheels 76, preventing manual intervention with the steering wheel during autonomous steering. More specifically, a torque sensor 80 is provided on the power assist steering system 20 that senses torque on the steering wheel that is not expected from autonomous control of the steering wheel and therefore indicative of manual intervention, whereby the hitch assist system 10 may alert the driver to discontinue manual intervention with the steering wheel and/or discontinue autonomous steering. In alternative embodiments, some vehicles have a power assist steering system 20 that allows a steering wheel to be partially decoupled from movement of the steered wheels 76 of such a vehicle.

Figure 3:
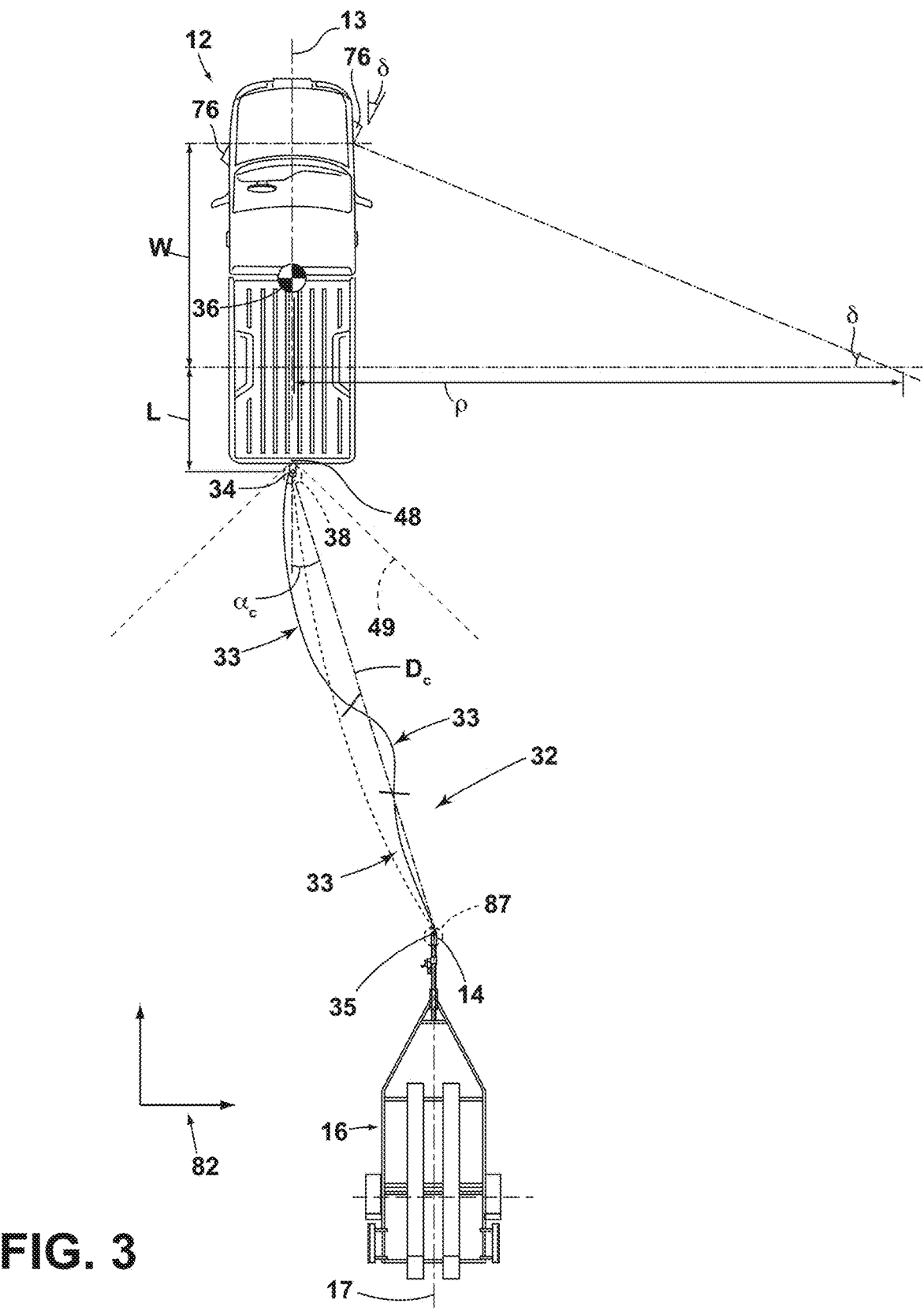
FIG. 3 is an overhead schematic view of a vehicle during a step of the alignment sequence with the trailer.

With continued reference to FIG. 2, the power assist steering system 20 provides the controller 26 of the hitch assist system 10 with information relating to a rotational position of steered wheels 76 of the vehicle 12, including a steering angle δ. The controller 26 in the illustrated embodiment processes the current steering angle, in addition to other vehicle 12 conditions to guide the vehicle 12 along the desired path 32 (FIG. 3). It is conceivable that the hitch assist system 10, in additional embodiments, may be an integrated component of the power assist steering system 20. For example, the power assist steering system 20 may include a hitch assist algorithm for generating vehicle steering information and commands as a function of all or a portion of information received from the imaging system 18, the power assist steering system 20, a vehicle brake control system 70, a powertrain control system 72 (which includes throttle 73, and the transmission system 92 with gear selector 94), and other vehicle sensors and devices, as well as a human-machine interface 40, as discussed further below.

As also illustrated in FIG. 2, the vehicle brake control system 70 may also communicate with the controller 26 to provide the hitch assist system 10 with braking information, such as vehicle wheel speed, and to receive braking commands from the controller 26. For instance, vehicle speed information can be determined from individual wheel speeds as monitored by the brake control system 70. Vehicle speed may also be determined from the powertrain control system 72, the speed sensor 56, and the positioning system 22, among other conceivable means. In some embodiments, individual wheel speeds can also be used to determine a vehicle yaw rate γ̇, which can be provided to the hitch assist system 10 in the alternative or in addition to the vehicle yaw rate sensor 58. The hitch assist system 10 can, further, provide vehicle braking information to the brake control system 70 for allowing the hitch assist system 10 to control braking of the vehicle 12 during backing of the trailer 16. For example, the hitch assist system 10, in some embodiments, may regulate speed of the vehicle 12 during alignment of the vehicle 12 with the coupler 14 of trailer 16, which can reduce the potential for a collision with trailer 16, and can bring vehicle 12 to a complete stop at a determined endpoint 35 of path 32. It is disclosed herein that the hitch assist system 10 can additionally or alternatively issue an alert signal corresponding to a notification of an actual, impending, and/or anticipated collision with a portion of trailer 16. The powertrain control system 72, as shown in the embodiment illustrated in FIG. 2, may also interact with the hitch assist system 10 for regulating speed and acceleration of the vehicle 12 during partial or autonomous alignment with trailer 16. As mentioned above, regulation of the speed of the vehicle 12 may be advantageous to prevent collision with trailer 16.

Additionally, the hitch assist system 10 may communicate with human-machine interface ("HMI") 40 for the vehicle 12. The HMI 40 may include a vehicle display 44, such as a center-stack mounted navigation or entertainment display (FIG. 1). HMI 40 further includes an input device, which can be implemented by configuring display 44 as a portion of a touchscreen 42 with circuitry 46 to receive an input corresponding with a location over display 44. Other forms of input, including one or more joysticks, digital input pads, or the like can be used in place or in addition to touchscreen 42. Further, the hitch assist system 10 may communicate via wireless communication with another embodiment of the HMI 40, such as with one or more handheld or portable devices 96 (FIG. 1), including one or more smartphones. The portable device 96 may also include the display 44 for displaying one or more images and other information to a user. For instance, the portable device 96 may display one or more images of the trailer 16 on the display 44 and may be further able to receive remote user inputs via touchscreen circuitry 46. In addition, the portable device 96 may provide feedback information, such as visual, audible, and tactile alerts.

Still referring to the embodiment shown in FIG. 2, the controller 26 is configured with a microprocessor 60 to process logic and routines stored in memory 62 that receive information from the above-described sensors and vehicle systems, including the imaging system 18, the power assist steering system 20, the vehicle brake control system 70, the powertrain control system 72, and other vehicle sensors and devices. The controller 26 may generate vehicle steering information and commands as a function of all or a portion of the information received. Thereafter, the vehicle steering information and commands may be provided to the power assist steering system 20 for affecting steering of the vehicle 12 to achieve a commanded path 32 (FIG. 3) of travel for alignment with the coupler 14 of trailer 16. The controller 26 may include the microprocessor 60 and/or other analog and/or digital circuitry for processing one or more routines. Also, the controller 26 may include the memory 62 for storing one or more routines, including an image processing 64 routine and/or hitch detection routine, a path derivation routine 66, and an operating routine 68. It should be appreciated that the controller 26 may be a stand-alone dedicated controller or may be a shared controller integrated with other control functions, such as integrated with a vehicle sensor system, the power assist steering system 20, and other conceivable onboard or off-board vehicle control systems. It should further be appreciated that the image processing routine 64 may be carried out by a dedicated processor, for example, within a stand-alone imaging system for vehicle 12 that can output the results of its image processing to other components and systems of vehicle 12, including microprocessor 60. Further, any system, computer, processor, or the like that completes image processing functionality, such as that described herein, may be referred to herein as an "image processor" regardless of other functionality it may also implement (including simultaneously with executing image processing routine 64).

System 10 can also incorporate an imaging system 18 that includes one or more exterior cameras, which in the illustrated examples include rear camera 48, center high-mount stop light (CMHSL) camera 50, and side-view cameras 52a and 52b, although other arrangements including additional or alternative cameras are possible. In one example, imaging system 18 can include rear camera 48 alone or can be configured such that system 10 utilizes only rear camera 48 in a vehicle with multiple exterior cameras. In another example, the various cameras 48, 50, 52a, 52b included in imaging system 18 can be positioned to generally overlap in their respective fields of view, which may correspond with rear camera 48, center high-mount stop light (CMHSL) camera 50, and side-view cameras 52a and 52b, respectively. In this manner, image data 55 from two or more of the cameras can be combined in image processing routine 64, or in another dedicated image processor within imaging system 18, into a single image. In an extension of such an example, the image data 55 can be used to derive stereoscopic image data that can be used to reconstruct a three-dimensional scene of the area or areas within overlapped areas of the various fields of view of the various cameras including any objects (obstacles or coupler 14, for example) therein. In an embodiment, the use of two images including the same object can be used to determine a location of the object relative to the two image sources, given a known spatial relationship between the image sources. In this respect, the image processing routine 64 can use known programming and/or functionality to identify an object within image data 55 from the various cameras 48, 50, 52a, and 52b within imaging system 18. In either example, the image processing routine 64 can include information related to the positioning of any cameras 48, 50, 52a, and 52b present on vehicle 12 or utilized by system 10, including relative to the center 36 (FIG. 1) of vehicle 12, for example such that the positions of cameras 48, 50, 52a, and 52b relative to center 36 and/or to each other can be used for object positioning calculations and to result in object position data relative to the center 36 of vehicle 12, for example, or other features of vehicle 12, such as hitch ball 34 (FIG. 1), with known positions relative to center 36.

The image processing routine 64 can be specifically programmed or otherwise configured to locate coupler 14 within image data 55. In one example, the image processing routine 64 can first attempt to identify any trailers 16 within the image data 55, which can be done based on stored or otherwise known visual characteristics of trailer 16, of an number of different types, sizes or configurations of trailers compatible with system 10, or trailers in general. When a trailer 16 is identified, system 10 can seek confirmation from the user that the identification of the trailer 16 is accurate and is the correct trailer for which to complete an automated hitching operation. After the trailer 16 is identified, controller 26 may then identify the coupler 14 of that trailer 16 within the image data 55 based, similarly, on stored or otherwise known visual characteristics of coupler 14 or couplers in general. In another embodiment, a marker in the form of a sticker or the like may be affixed with trailer 16 in a specified position relative to coupler 14 in a manner similar to that which is described in commonly-assigned U.S. Pat. No. 9,102,271, the entire disclosure of which is incorporated by reference herein. In such an embodiment, image processing routine 64 may be programmed with identifying characteristics of the marker for location in image data 55, as well as the positioning of coupler 14 relative to such a marker so that the location 28 of coupler 14 can be determined based on the marker location. Additionally or alternatively, controller 26 may seek confirmation of the determined coupler 14. If the coupler 14 determination is not confirmed, further image processing may be provided, or user-adjustment of the position 28 of coupler 14 may be facilitated, either using touchscreen 42 or another input to allow the user to move the depicted position 28 of coupler 14 on touchscreen 42, which controller 26 uses to adjust the determination of position 28 of coupler 14 with respect to vehicle 12 based on the above-described use of image data 55.

As shown in FIG. 3, the image processing routine 64 and operating routine 68 may be used in conjunction with each other to determine the path 32 along which hitch assist system 10 can guide vehicle 12 to align hitch ball 34 and coupler 14 of trailer 16. Upon initiation of hitch assist system 10, such as by user input on touchscreen 42, for example, image processing routine 64 can identify coupler 14 within the image data 55 and at least attempt to estimate the position 28 of coupler 14 relative to hitch ball 34 using the image data 55 in accordance with one of the examples discussed above to determine a distance $D_c$ to coupler 14 and an angle $\alpha_c$ of offset between a line connecting hitch ball 34 and coupler 14 and the longitudinal axis of vehicle 12. Image processing routine 64 can also be configured to identify the trailer 16 overall and can use the image data of trailer 16, alone or in combination with the image data of coupler 14, to determine the orientation or heading 17 of trailer 16. In this manner the path 32 can further be derived to align vehicle 12 with respect to trailer 16 with the longitudinal axis 13 of vehicle 12 within a predetermined angular range of the heading 17 of trailer 16. Notably, such alignment may not require that the longitudinal axis 13 of vehicle 12 is parallel or collinear with the heading 17 of trailer 16, but may simply be within a range that generally allows connection of hitch ball 34 with coupler 14 without collision between vehicle 12 and trailer 16 and may, further allow immediate controlled backing of trailer 16 using vehicle 12. In this manner, the angular range may be such that the alignment of vehicle 12 with trailer 16 at the end of the operating routine 68 is such that the angle between longitudinal axis 13 and heading 17 is less than the jackknife angle between the vehicle 12 and trailer 16 when coupled or a reasonable estimate thereof. In one example, the angular range may be such that longitudinal axis 13 is within about 30° from collinear with heading 17 in either direction. When collected, the position information can then be used in light of the position 28 of coupler 14 within the field of view of the image data 55 to determine or estimate the height $H_c$ of coupler 14. Once the positioning $D_c$, $\alpha_c$ of coupler 14 has been determined and, optionally, confirmed by the user, controller 26 can take control of at least the vehicle steering system 20 to control the movement of vehicle 12 along the desired path 32 to align the vehicle hitch ball 34 with coupler 14, as discussed further below.

Continuing with reference to FIG. 3 with additional reference to FIG. 2, controller 26, having estimated the positioning $D_c$, $\alpha_c$ of coupler 14, as discussed above, can, in one example, execute path derivation routine 66 to determine vehicle path 32 to align the vehicle hitch ball 34 with coupler 14. In particular, controller 26 can have stored in memory 62 various characteristics of vehicle 12, including the wheelbase W, the distance from the rear axle to the hitch ball 34, which is referred to herein as L, as well as the maximum angle to which the steered wheels 76 can be turned $\delta_{max}$. As shown, the wheelbase W and the current steering angle $\delta$ can be used to determine a corresponding turning radius $\rho$ for vehicle 12 according to the equation:

$$\rho = \frac{1}{W \tan \delta}, \tag{1}$$

in which the wheelbase W is fixed and the steering angle $\delta$ can be controlled by controller 26 by communication with steering system 20, as discussed above. In this manner, when the maximum steering angle $\delta_{max}$ is known, the smallest possible value for the turning radius $\mu_{min}$ is determined as:

$$\rho_{min} = \frac{1}{W \tan \delta_{max}}. \tag{2}$$

Path derivation routine 66 can be programmed to derive vehicle path 32 to align a known location of the vehicle hitch ball 34 with the estimated position 28 of coupler 14 that may take into account the determined minimum turning radius $\rho_{min}$ to allow path 32 to use the minimum amount of space and maneuvers. In this manner, path derivation routine 66 can determine both a lateral distance to the coupler 14 and a rearward distance to coupler 14 and derive a path 32 that achieves the needed lateral and forward-backward movement of vehicle hitch ball 34 within the limitations of steering system 20. The derivation of path 32 further takes into account the positioning of hitch ball 34, based on length L, relative to the tracked location of vehicle 12 (which may correspond with the center 36 of mass of vehicle 12, the location of a GPS receiver, or another specified, known area) to determine the needed positioning of vehicle 12 to align hitch ball 34 with coupler 14 and to appropriately locate the frame of reference for the above-discussed calculations. It is noted that hitch assist system 10 can compensate for horizontal movement Δx of coupler 14 in a driving direction away from axle 84 by determining the movement of coupler 14 in the vertical direction Δy that will be needed to receive hitch ball 34 within coupler 14. Such functionality is discussed further in co-pending, commonly-assigned U.S. patent application Ser. Nos. 14/736,391 and 16/038,462, the entire disclosures of which are hereby incorporated by reference herein. In further aspects, path derivation routine 66 can operate to achieve alignment of the vehicle axis 13 with the trailer heading 17 within a predetermined range (as discussed above) and/or to avoid any obstacles detected by image processing routine 64. Still further, the path 32 derived by path derivation routine 66 may take into account the initial position of the steered wheels 76 (i.e. an initial steering angle $\delta$) by initially including movement of the vehicle 12 in the direction dictated by the initial position of the steered wheels 76 and only changing the steering angle $\delta$ as needed once rearward movement of vehicle 12 has been initiated (as discussed below). Operation according to this or a similar scheme may make use of the system less alarming to the driver by removing the need to initially adjust the steering angle S.

As discussed above, once the desired path 32 has been determined, controller 26 is then allowed to at least control the steering system 20 of vehicle 12 with the powertrain control system 72 and the brake control system 70 (whether controlled by the driver or by controller 26, as discussed below) controlling the velocity (forward or rearward) of vehicle 12. In this manner, controller 26 can receive data regarding the position of vehicle 12 during movement thereof from positioning system 22 while controlling steering system 20, as needed to maintain vehicle 12 along path 32. In particular, the path 32, having been determined based on the vehicle 12 and the geometry of steering system 20, can adjust the steering angle $\delta$, as dictated by path 32, depending on the position of vehicle 12 there along. It is additionally noted that in an embodiment, the path 32 may comprise a progression of steering angle $\delta$ adjustment that is dependent on the tracked vehicle position.

As illustrated in FIG. 3, vehicle path 32 can be determined to achieve the needed lateral and rearward movement within the smallest area possible and/or with the lowest number of maneuvers, while, optionally avoiding obstacles or achieving a desired alignment between vehicle axis 13 and trailer heading 17. In the illustrated example of FIG. 3, path 32 can include three portions 33 defined by steering of wheels 76 in different directions to collectively traverse the needed lateral movement of vehicle 12 to bring hitch ball 34 into alignment with coupler 14. It is noted that variations in the depicted path 32 may be used. It is further noted that the estimates for the positioning $D_c$, $\alpha_c$ of coupler 14 may become more accurate as vehicle 12 traverses path 32, including to position vehicle 12 in front of trailer 16 and as vehicle 12 approaches coupler 14. Accordingly, such estimates can be continuously derived and used to update path derivation routine 66, if necessary, in the determination of the adjusted endpoint 35 for path 32, as discussed above. In a similar manner, the path 32, as derived using the position and orientation data acquired from smartphone 96, can be finetuned once the image processing routine 64 can identify coupler 14 in the image data 55, with continued updates for path 32 being similarly derived as the image data 55 becomes increasingly clear during the approach toward trailer 16. It is further noted that, until such a determination can be made, the dead reckoning device 24 can be used to track the location of vehicle 12 in its movement along path 32 toward the initially-derived endpoint 35.

In one aspect, it may be desired to communicate to the driver that system 10 has identified the coupler 14 of the trailer 16 and that path derivation routine 66 has been completed successfully with an indication of the general direction of the path and the final position of hitch ball 34 included at the end of the derived path. It may also be desired to provide some level of visual tracking for user as vehicle 12 traverses the path 32, as discussed further below. As shown in FIG. 3, such communication may be made using the display 44 associated with the vehicle human machine interface ("HMI") 40 within vehicle 12. In one aspect, system 10 can be programmed or otherwise configured to output a graphical representation of the path as an overlay on a video image 43 presented on HMI 40 that includes image data 55 with the path image being correlated with the known field of view and image characteristics of camera 48, for example, to place the path image in the perspective of the portion of the video image 43 based on image data 55 such that the path image appears extending rearward of hitch ball 34 to the location of coupler 14. In this manner, the ability of system 10 to project a path image that reflects the actual path 32 in a dynamic manner, including a path 32 with multiple portions 33 of varying characteristics may be dependent on the configuration and processing capability of system 10. In particular, the capability to dynamically display a complex path 32 and to accurately correlate the movement of vehicle 12 along the actual path 32 with the displayed path may require system 10 to include a dedicated graphical processing unit ("GPU") or other processing capability that may not otherwise be included with or needed in connection with system 10. Further, such capability and the related hardware may increase the overall power consumption of system 10, which may have an undesired negative impact on the fuel consumption of the subject vehicle 12. The inclusion of such hardware or other system capability and/or the decreased efficiency resulting from such path display capability may outweigh the benefits from displaying a complex dynamic path on HMI 40. In this manner, system 10 may be configured, instead, to display a simplified path 86 on HMI in the form of static image that can be updated at acceptable intervals.

Figure 4:
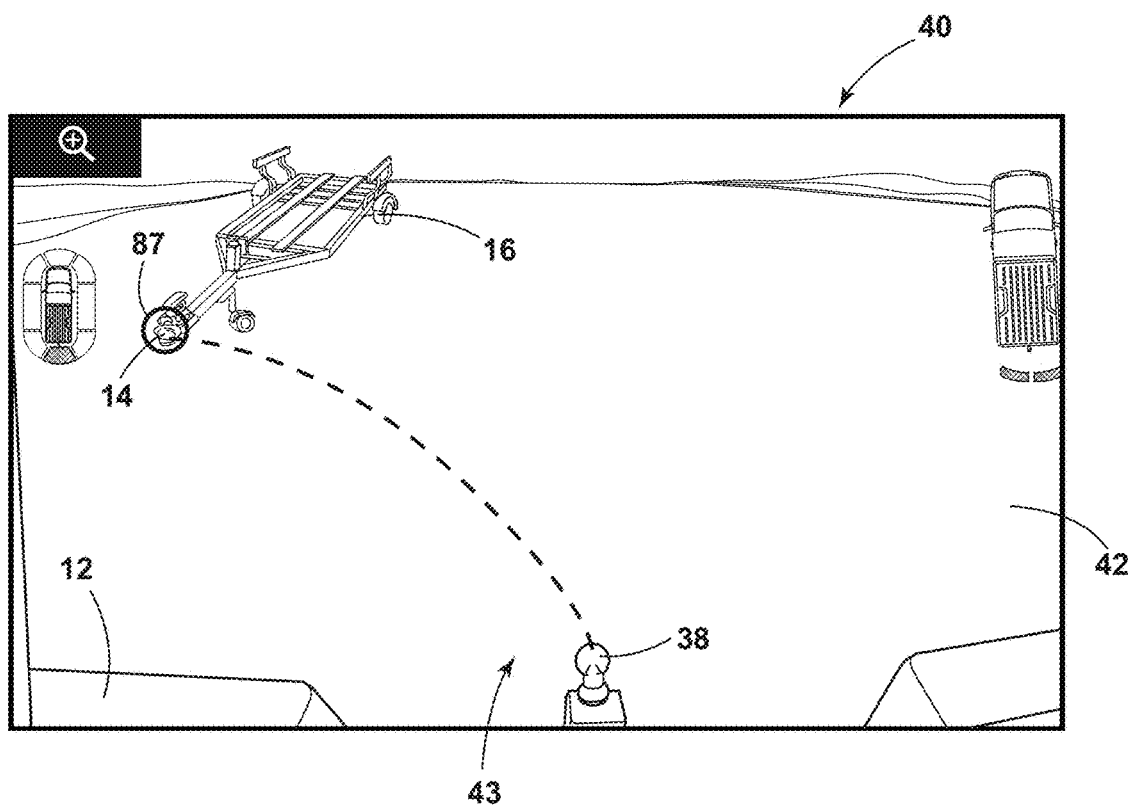
FIG. 4 is a depiction of an image received from the vehicle camera during the alignment sequence step with a simplified vehicle path overlaid thereon.
Figure 5:
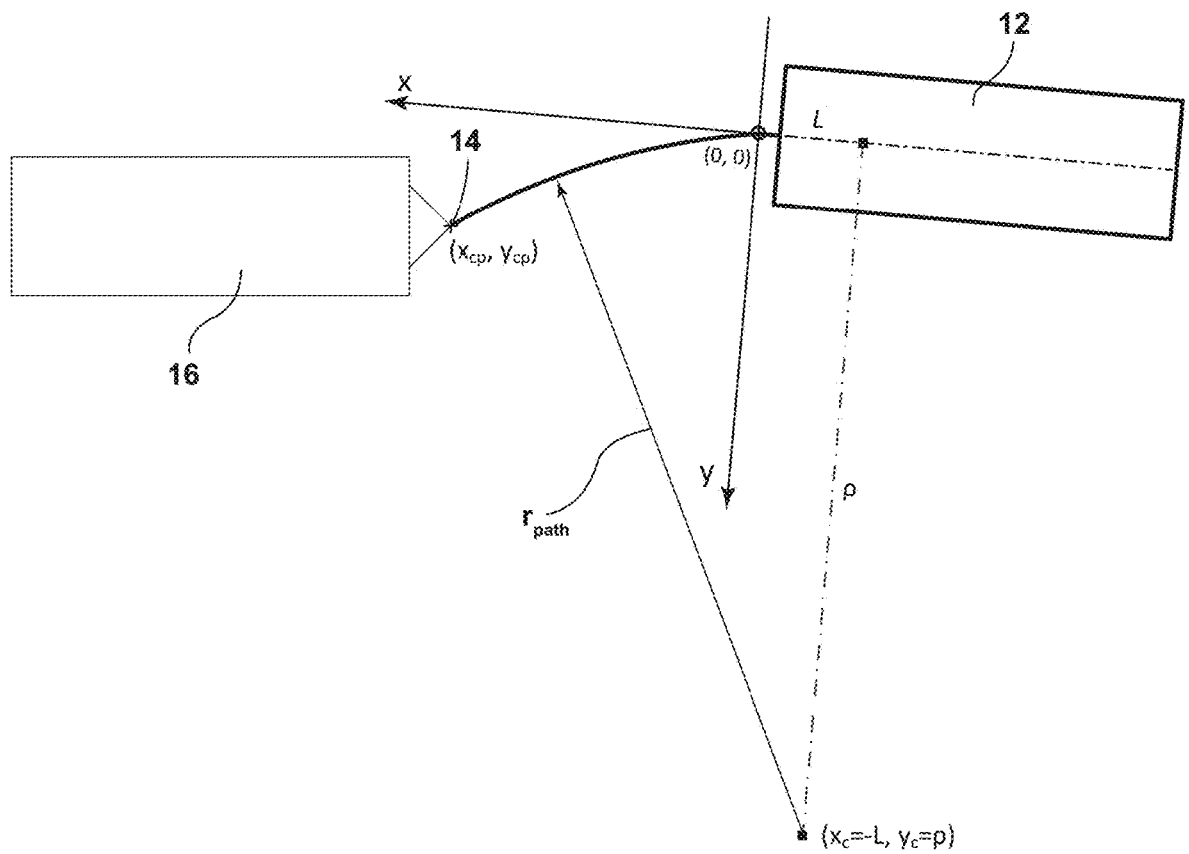
FIG. 5 is an overhead schematic view depicting the geometry for determining a simplified path radius.

As shown in FIGS. 3 and 4 the simplified path 86 can be a single arc-shaped segment extending from the hitch ball 35 to the coupler 14. In one aspect the simplified path 86 can represent a possible actual path to align hitch ball 35 with coupler 14 in that the simplified path 86 can link the known position of hitch ball 35 with the detected position of coupler 14. Referring to FIG. 5, the theoretical radius $r_{path}$ of the arc-shaped segment can be determined as follows:

$$r_{path} = \sqrt{\rho^2 + L^2}, \quad (3)$$

$$\text{where: } \rho = \frac{x_{cp}^2 + 2x_{cp}L + y_{cp}^2}{2y_{cp}}, \text{ and} \quad (4)$$

$(x_{cp},y_{cp})$ represents the detected position of coupler 14.

In this manner, if system 10 were to cause vehicle 12 to navigate a path 32 corresponding with the simplified path 86, the simplified path 86 could be presented on display 40 and adjusted only in length to track coupler 14 within the image 43 as the position thereof changes with movement of vehicle 12. In such an implementation, it may, nevertheless, be beneficial to not update the depiction of simplified path 86 dynamically (i.e. in real time) but to, instead, maintain a static depiction of the simplified path 86 for an interval and to only update the depiction of simplified path 86 periodically, as doing so may save computing power and lower the requirements of system 10 and/or the power consumption of system 10 and the related vehicle 12.

When presenting static overlay depiction of simplified path 86, system 10 can be programmed or otherwise configured to determine when the depiction should be updated based in a change in state of the hitch-ball coupler relationship. In one aspect, such an update can be dictated by monitoring the theoretical radius of the path with respect to the radius of the currently depicted path. In another aspect, such an update can be made at regular time intervals during the backing of vehicle 12 under the control of system 10. In another aspect, the updating of the simplified path 86 depiction can be dictated by monitoring the position of coupler 14 in the depicted image 43 with respect to the currently depicted endpoint 87 of the simplified path 86. As shown in FIG. 4, the endpoint 35 can correspond with the initial position of coupler 14 when the particular depiction is determined and displayed and can be depicted as a circle around the detected coupler 14. As shown, the circle at endpoint 87 can be somewhat larger than the coupler 14 such that a level of visual tolerance is established. In this respect, the depiction of simplified path 86 can be updated when coupler 14 is determined to have moved out of the circle at endpoint 87 (or outside of an additional buffer area surrounding the circle). In some aspects, such a tolerance may correspond with between 1 and 3 feet of vehicle 12 travel along the ground plane 30 and, which depending on the speed of vehicle, can take between one second and three seconds. The size of the depicted circle at endpoint 87 and any tolerance or buffer therearound can be adjusted to correspondingly adjust the approximate time interval for updating the static overlay of simplified path 86.

In one implementation, the simplified path 86 can be determined by an algorithm stored in the memory 62 accessible by microprocessor 60. The algorithm can be operable to determine when the static overlay depictions of the simplified path 86 are desired, according to adjustable criteria, and can generate such depictions when it is determined that they are to be displayed or updated. The algorithm may determine when each overlay is displayed based on the actual planned vehicle path 32 for the autonomous maneuver, including in advance or in real-time as vehicle 12 backs along path 32 during execution of operating routine 68. The overlays can be based on a mathematically-derived simplified path 86 that generally communicates aspects of the planned path 32 of the vehicle 12 to the user.

Figure 6:
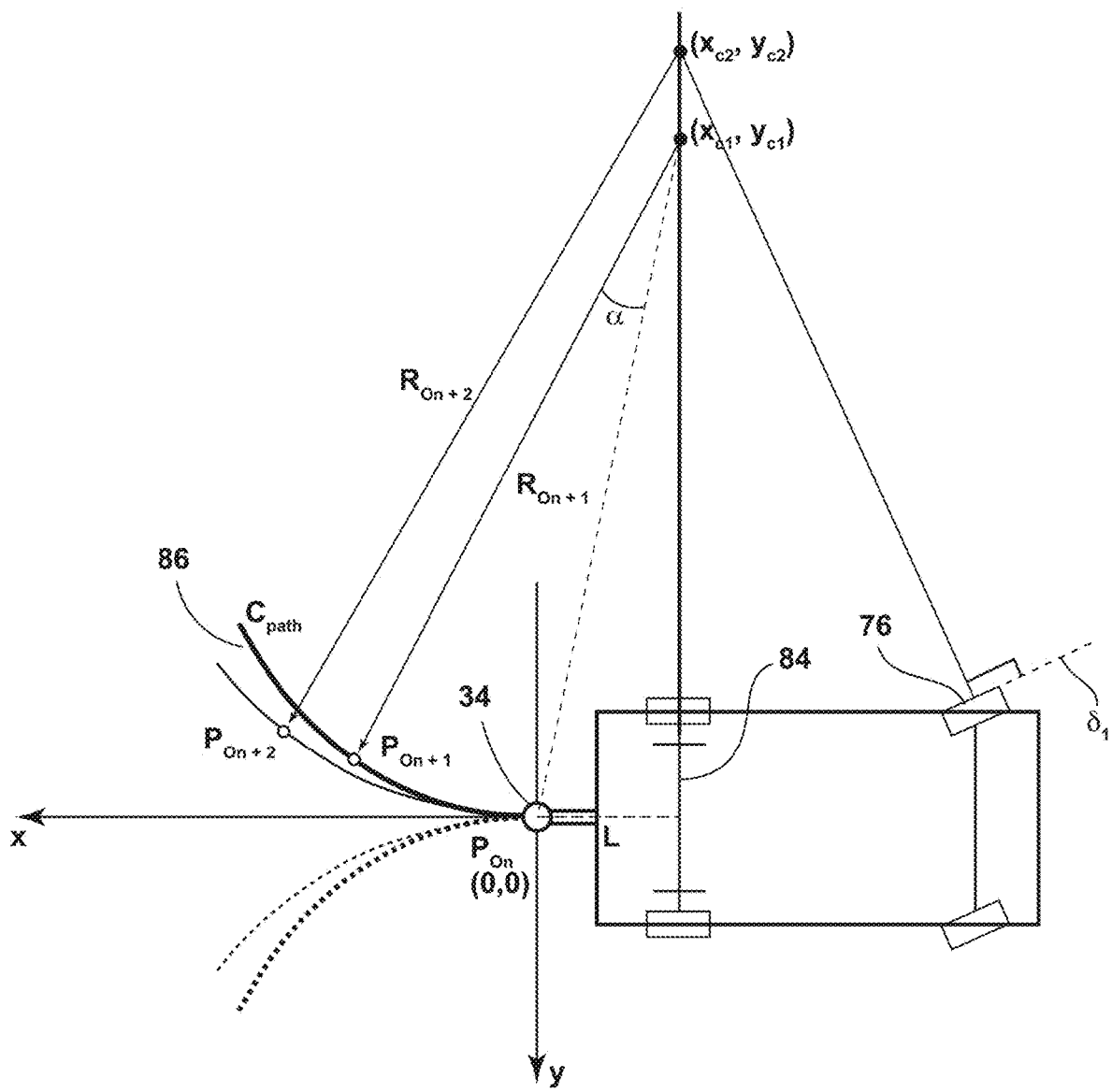
FIG. 6 is an overhead schematic view depicting the determination of the simplified vehicle path.

As shown in FIGS. 5 and 6, the arced path of the simplified path 86 may be defined by the following equations, where x and y are points on the normalized path:

$$x = -x_c \cos(-\alpha) + y_c \sin(-\alpha) + x_c \quad (5)$$

$$y = -x_c \sin(-\alpha) - y_c \cos(-\alpha) + y_c, \quad (6)$$

where:
$x_c, y_c$ is a coordinate representing the turn center for a given position of coupler 14;
$\rho$ represents the distance between the center of the rear axle and the turn center for the detected position of coupler 14 ($x_{cp}, y_{cp}$) (as discussed above with respect to FIG. 3);
L represents the distance between the center of the rear axle and a point ($P_{On}$) defined along the center line of the vehicle and coincident with hitch ball 34, coordinate (0,0); and
$\alpha$ represents the angle between the hitch ball 34 ($P_{On}$) and any point ($P_{On+1}$) on the simplified path 86 with respect to the turn center ($x_c, y_c$).

Therefore, by increasing a from 0° to a predetermined angle (i.e., 60°) at a predetermined interval (i.e., 2°), a number of points can be generated using Equations (5) and (6) to represent the simplified path 86.

In this manner, the turn center for a left turn can be described as $x_c = -L$ and $y_c = -\rho$ and can be described as $x_c = -L$ and $y_c = \rho$ for a right turn using a frame of reference centered at hitch ball 34 and with its x-axis aligned with the vehicle 12 longitudinal axis 13. As further shown in FIGS. 5 and 6, the simplified path 86 represents the path that would be traversed by the hitch ball 34 of vehicle 12. Notably, the length L, as well as the wheelbase W, which affect the positioning of the turn center for the determined steering angle are configurable based on the various vehicle parameters and can be stored in memory 62. Using equation (5) and (6), a set of arcs with different turn radius and therefore different turn center ($x_c, y_c$) are stored in the memory. During the hitching maneuver, depending on the trailer coupler position ($x_{cp}, y_{cp}$) and calculated turn radius $r_{path}$ using Equation (3), a stored arc which has a radius closest to $r_{path}$ will be retrieved as the simplified path 86.

Returning to the example of FIG. 3, the use of the above scheme in depicting simplified path 86 in place of an actual path 32 including multiple segments 33 in varying directions, including some such segments 33 that do not extend directly toward coupler 14 can result in the simplified path 86 that is determined with coupler 14 in a particular position becoming unaligned with coupler 14 during backing of vehicle 12 along path 32. As discussed above, during such backing, the end circle 87 of the depicted simplified path 86 will move away from the location in image 43 that corresponds with coupler 14. Additionally, in situations similar to what is depicted in FIG. 3, the simplified path 86 will also move laterally away from an aligned position with the coupler 14. In this manner, a subsequent iteration of the portion of the algorithm that determines the geometry of simplified path 86 may result in a different arc shape being generated in light of the change in relative position of coupler 14 to vehicle 12, as well as the theoretical turn radius used in the subsequent determination of the turning center $(x_c,y_c)$ used to determine the subsequent static simplified path 86.

The schematic depiction of FIG. 6 shows the changing simplified path projection for position n+1 and n+2 of the vehicle during an autonomous maneuver, for example, corresponding with a position of vehicle 12 relative to coupler 14 that is farther away than at n+1 such that the simplified path 86 corresponding with n+1 may be presented as an overlay of the video image 43 until system 10 determines that the simplified path 86 is no longer an accurate enough simplification for the given positioning (e.g., difference between $R_{On+2}$ and $R_{On+1}$ exceeds certain margin), whereupon the simplified path 86 corresponding with n+2 can replace the prior simplified path image 86. This simplified path 86 presentation and refreshing can occur as needed until hitch ball 34 is aligned with coupler 14. As can be seen in FIG. 4, the simplified path 86, derived according to the above algorithm can be presented as a still images overlaid on to the image 43 presented on HMI 40 using the image data 55 from camera 48, for example. In this manner, the geometry of simplified path 86 can be translated into an image thereof that corresponds with or otherwise appears to be visually in place within the particular image 43. In this manner, algorithm within system 10 can map the arced path geometry of simplified path 86 into the three-dimensional space presented in the two-dimensional image 43. That is, the coordinate system from FIGS. 5 and 6 within which simplified path 86 lies is mapped into the perspective view of image 43, which may be based on the known characteristics of camera 48 and any manipulations applied to the image data 55 to present it on screen 42. Such characteristics can include the focal length and field of view of camera 48 with any perspective correction and/or cropping carried out in presenting the image on screen 42. Further, the mapped coordinates can be placed within image 43 such that the depicted plane visually coincides with the height of hitch ball 34 and such that the origin $P_{On}$ is visually aligned with hitch ball 34. In this manner, the visual overlay depiction of simplified path 86 will extend rearward from the depiction of hitch ball 34 within image 43 in an arc that extends in proper perspective to the general location of coupler 14, which may be positioned within or close to endpoint circle 87.

Figure 7:
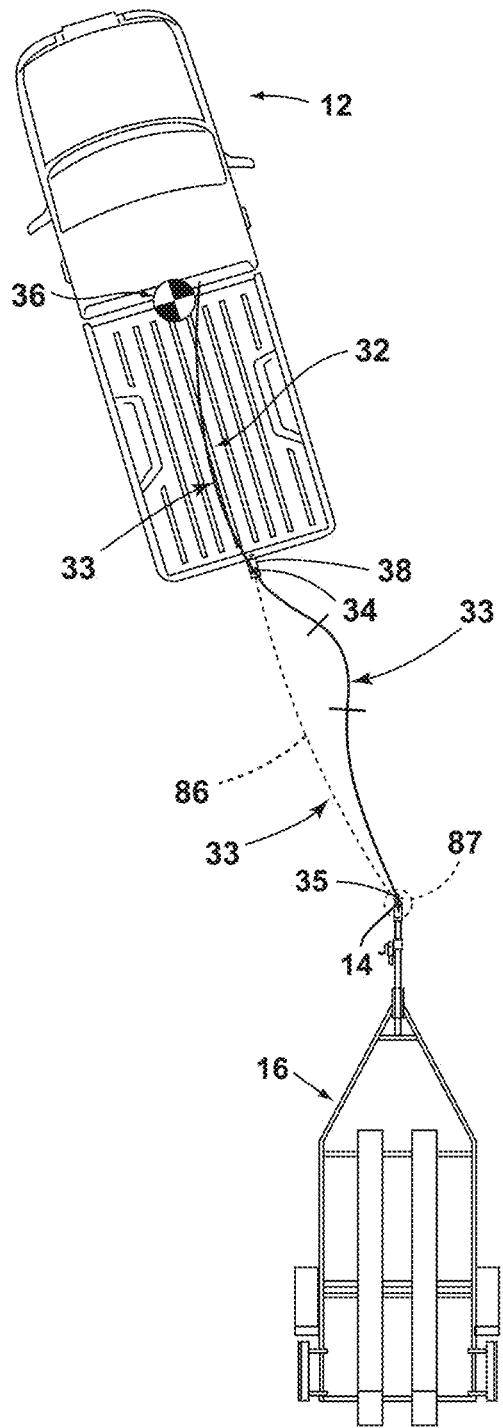
FIG. 7 is an overhead schematic view of the vehicle during a subsequent step of the alignment sequence with the trailer.
Figure 8:
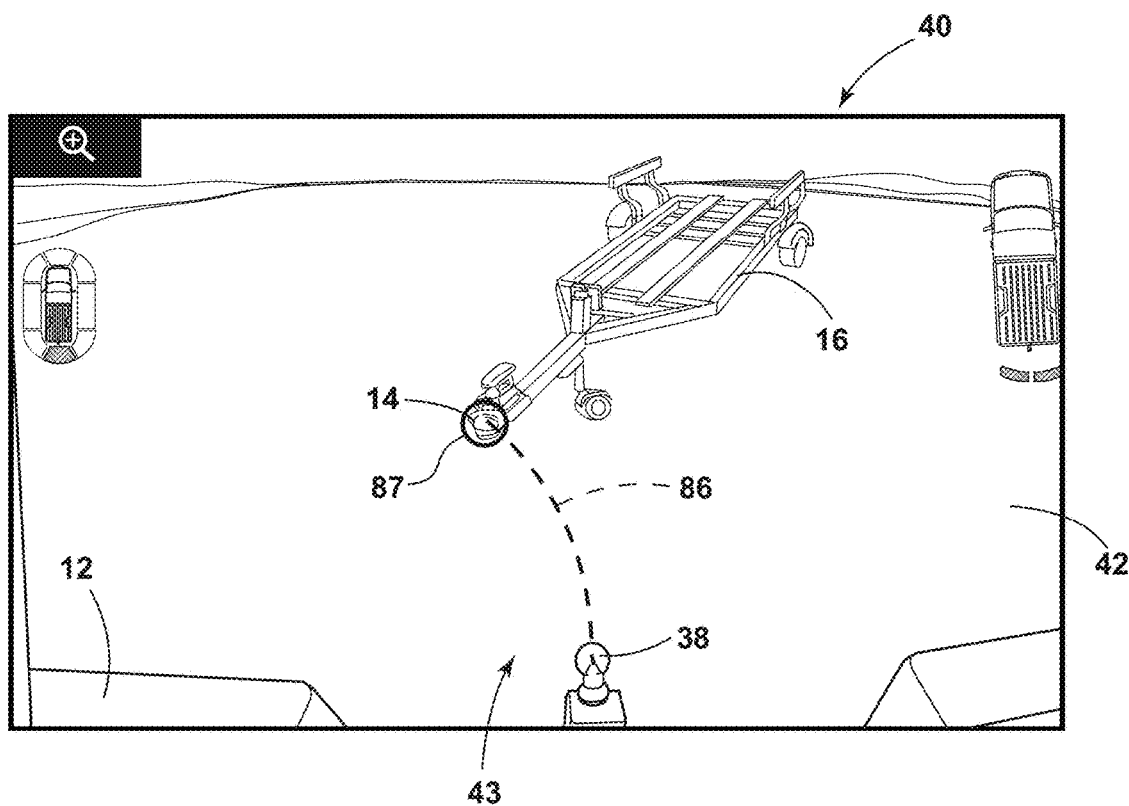
FIG. 8 is a depiction of an image received from a vehicle camera during the alignment sequence step of FIG. 6.
Figure 9:
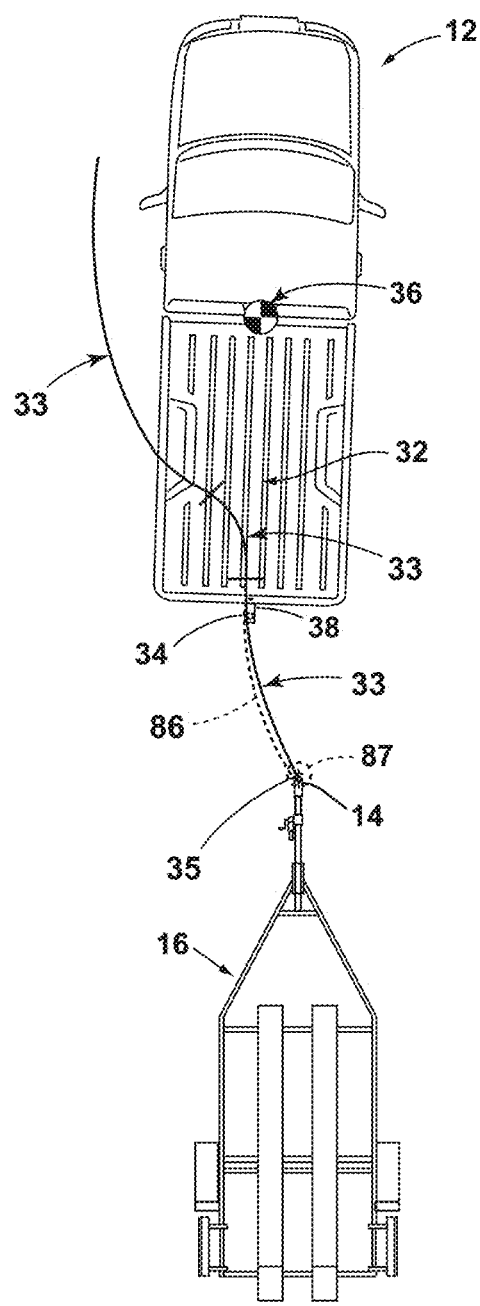
FIG. 9 is an overhead schematic view of the vehicle during a subsequent step of the alignment sequence with the trailer.
Figure 10:
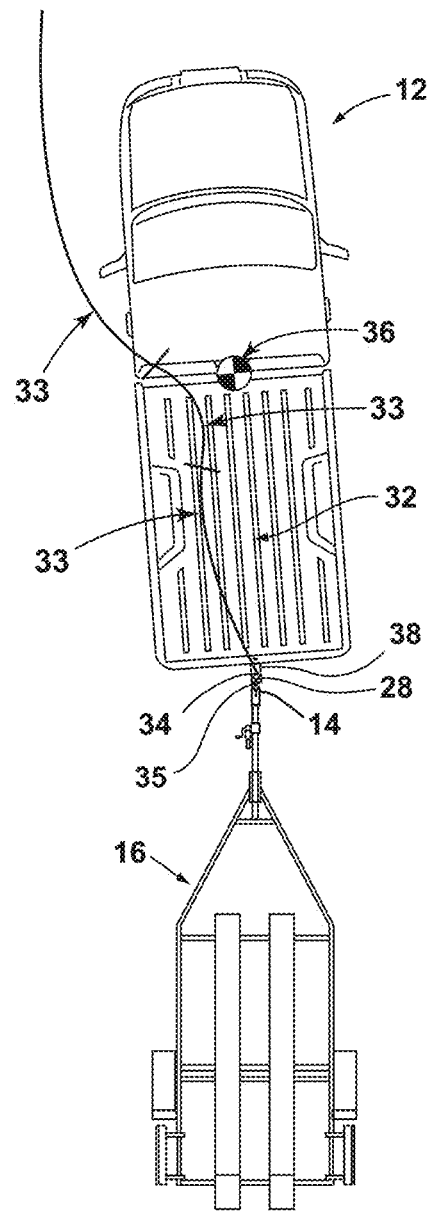
FIG. 10 is an overhead schematic view of the vehicle during a subsequent step of the alignment sequence with the trailer and showing the position of a hitch ball of the vehicle at an end of a derived alignment path.

Turning now to FIGS. 7-10, once the trailer 16 and coupler 14 have been identified, and system 10 determines the path 32 to align hitch ball 34 with the coupler 14 (with the initial simplified path 86 being determined and presented in the image 43 on screen 42), the operating routine 68 may continue to guide vehicle 12 to move hitch ball 34 toward the desired position $38_d$ relative to coupler 14 for coupler 14 to engage with hitch ball 34 when coupler 14 is lowered into horizontal alignment therewith. In the example discussed above, image processing routine 64 continuously monitors the positioning $D_c,\alpha_c$ of coupler 14, constantly or once available, during execution of operating routine 68, with continued movement of vehicle 12 along path 32, as shown in FIG. 7. As discussed above, as system 10 delays for a predetermined time or distance interval or, in another example, determines that the movement of vehicle 12 has placed coupler 14 out of a visually-acceptable proximity to simplified path 86, including with respect to the depicted endpoint circle 87, the simplified path 86 may be updated or otherwise re-calculated. As shown in FIGS. 7 and 8, such an update may result in a different simplified path 86 being derived with different characteristics, including the radius, arc length, etc. that can replace the prior image (i.e. from FIG. 4) with a new image of simplified path 86 that similarly extends from hitch ball 34 to within an acceptable range of coupler 14 in the image 43 presented on screen 42, as shown in FIG. 8. This process can be repeated, as called for by system 10 according to the criteria for simplified path 86 re-calculation, as vehicle 12 moves closer to trailer 16, as shown in FIG. 9, for example, until vehicle 12 reaches the desired position in which hitch ball 34 is aligned with coupler 14, as shown in FIG. 10.

As shown in FIGS. 11-14, a simplified path 86 according to the principles described above can be determined and represented in alternative forms. In one aspect, shown in FIG. 11, the simplified path 86 may be depicted as a straight line extending from hitch ball 34 to coupler 14, with system 10 providing an overlay of the straight line simplified path 86 on HMI 40 in a similar manner to that which is shown in FIGS. 4 and 8. In this manner, a plurality of straight line simplified path 86 images can be generated or otherwise created in advance in a manner that correlates with the positioning of hitch ball 34 within image 43 and the field of view from the camera (e.g. rear camera 48) from which the image data 55 is obtained. The stored simplified path 86 images can correspond with incremental positions of vehicle 12 with respect to coupler 14 and/or trailer 16 through a range of such positions. For example, as discussed above, the actual path 32 for vehicle 12 in approaching trailer 16 is limited by the minimum turning radius Amin, as it relates to the maximum steering angle max of vehicle 12 by Equation (2), above. In this manner, the limits of the range of possible coupler angles $\alpha_c$ between the longitudinal axis 13 of vehicle 12 and coupler 14 is defined by the equation:

$$|\alpha_c| \leq \tan^{-1}\frac{L}{\rho_{min}} \qquad (7)$$

In general, the range of possible coupler angles $\alpha_c$ may be within about 15° (in either direction) of longitudinal axis 13 of vehicle 12. Accordingly, a set of correlated straight line images can be stored for every degree (i.e. in 1° increments) throughout the range determined by Equation (7). Additionally, a plurality of such sets can be stored for given increments (e.g. 1' to 5') of the acceptable coupler distances $D_c$ for which system 10 can locate coupler 14 and back vehicle 12 into alignment between hitch ball 34 and coupler 14. With such sets/subsets of graphical straight line simplified paths 86 stored in memory 82, system 10 can cause the presentation of the appropriate one of such images for overlay on the image 43 presented on HMI 40 for the detected coupler 14 location $D_c,\alpha_c$ and can change the overlay image, as needed while the coupler 14 and its location $D_c,\alpha_c$ are tracked during operation of operating routine 68.

Figure 11:
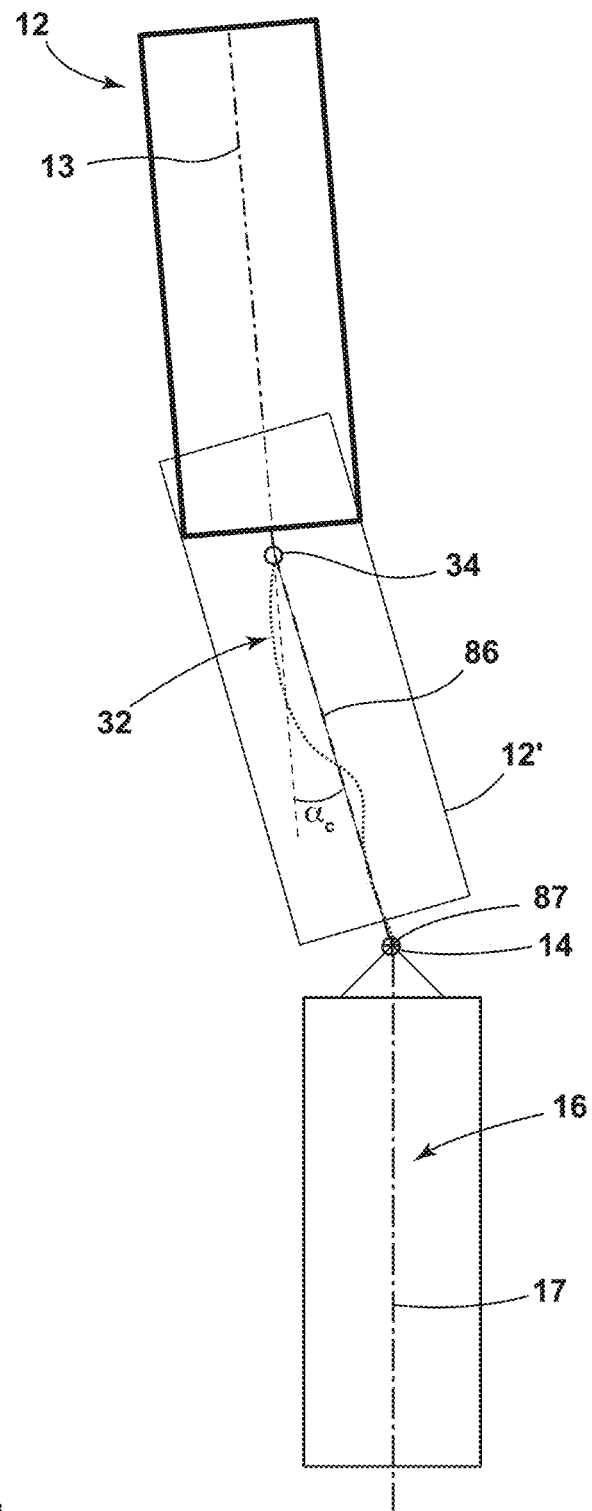
FIG. 11 is an overhead schematic view of an alternative simplified path.
Figure 12:
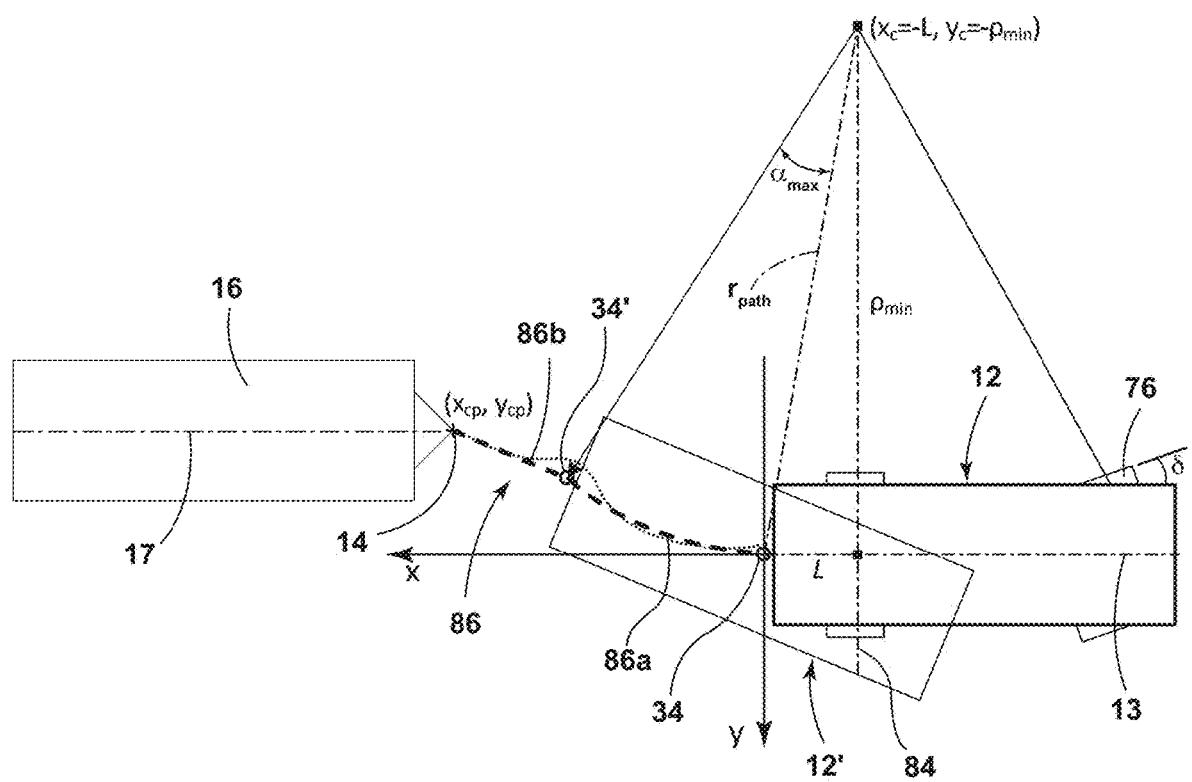
FIG. 12 is an overhead schematic view of an alternative, multi-portion simplified path.
Figure 13:
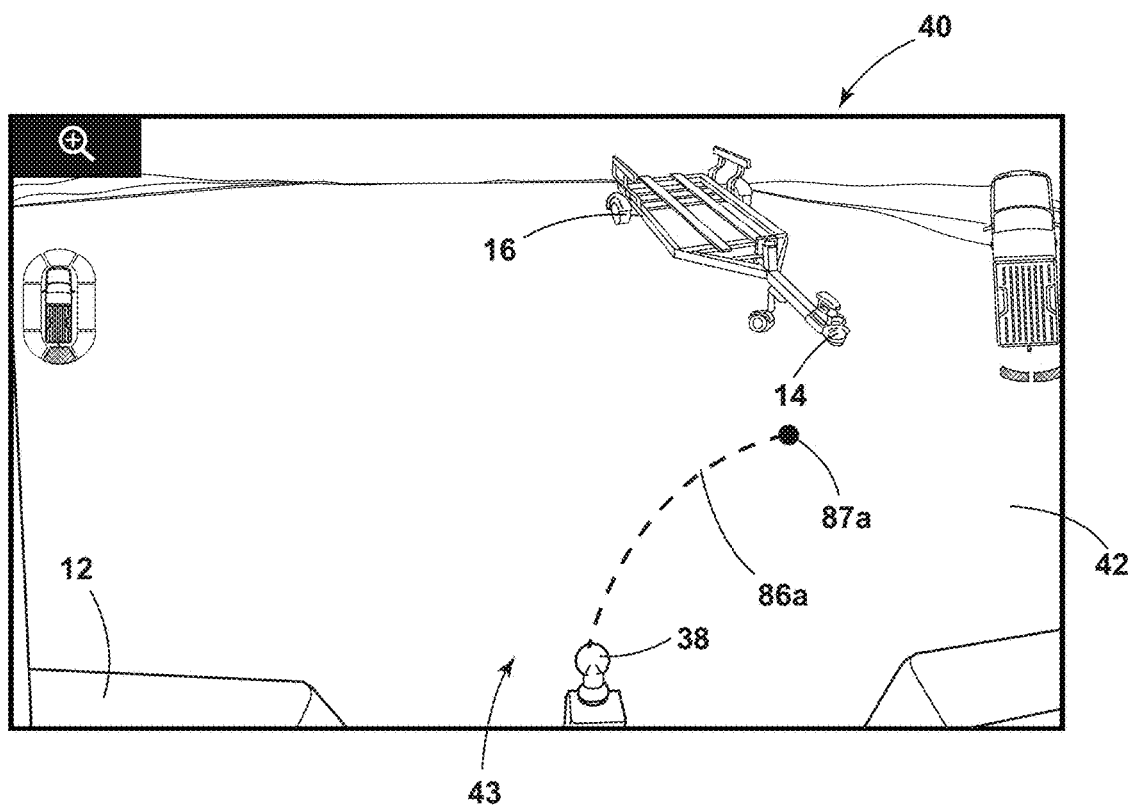
FIG. 13 is a depiction of an image received from the vehicle camera during an alignment sequence step with a first portion of the simplified vehicle path overlaid thereon.
Figure 14:
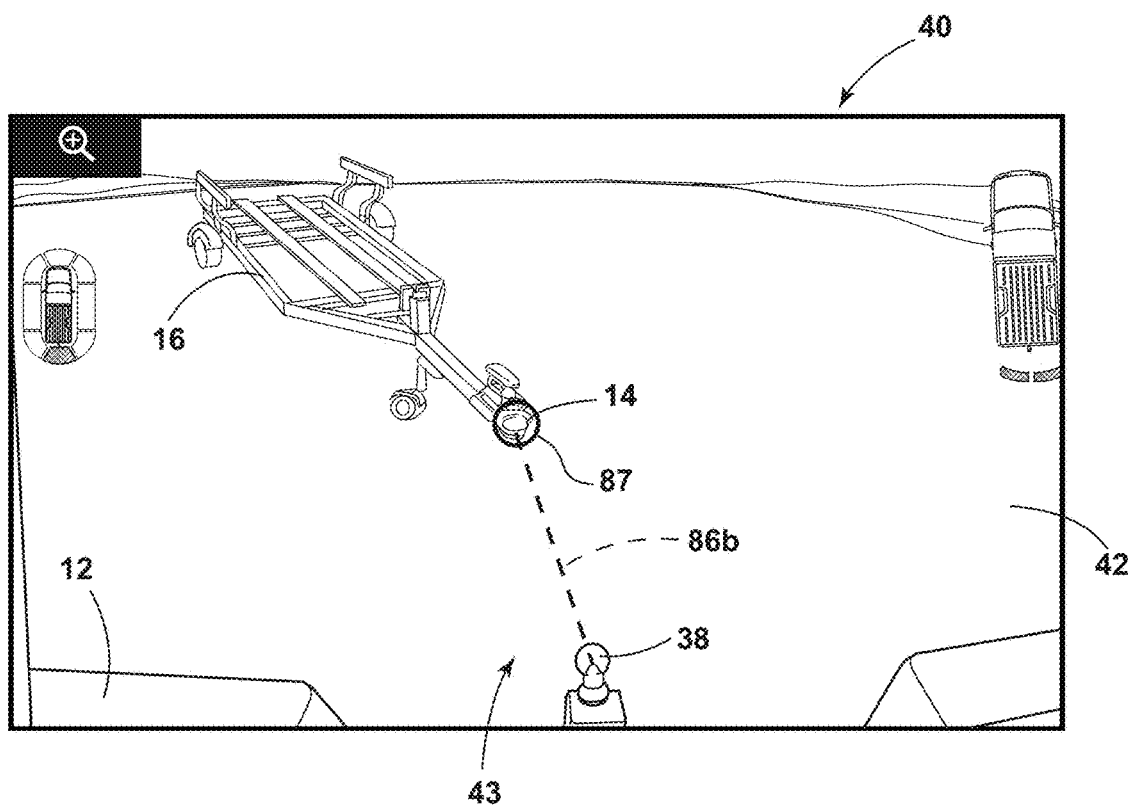
FIG. 14 is a depiction of a subsequent image received from the vehicle camera during a further alignment sequence step with a second portion of the simplified vehicle path overlaid thereon.

Turning to FIGS. 12-14, another example of an alternative simplified backing path 86 that can be presented graphically on image 43 is shown. In the example of FIG. 11, the backing path 86 is initially presented in the form of an arc 86*a* defined about a turn center $x_c,y_c$ that corresponds with the turn center determined using Equations (5) and (6), discussed above, when the given steering angle δ is at the maximum steering angle max for the given vehicle 12. For such a steering angle $\delta_{max}$, the radius ρ, as determined using Equation (2) will, again, be the minimum radius $\rho_{min}$ for vehicle 12 and results in simplified path 86 having a radius $r_{path}$ defined by the equation:

$$r_{path} = \sqrt{L^2 + \rho_{min}^2}. \quad (8)$$

As shown, the initially-presented arc for simplified backing path 86 does not extend the full distance $D_c$ between hitch ball 35 and coupler 14, but rather extends through an angle $\alpha_{max}$ that corresponds with the distance along the arced simplified path 86 that vehicle 12 would have to traverse to align vehicle 12 for straight backing toward coupler 14. As shown in FIG. 12, this angle αmax is defined by the equation:

$$\alpha_{max} = \sin^{-1} \frac{\rho_{min}}{\sqrt{(x_c - x_{cp})^2 + (y_c - y_{cp})^2}} - \tan^{-1} \frac{|y_c - y_{cp}|}{|x_c - x_{cp}|}. \quad (9)$$

where the coordinate $(x_{cp},y_{cp})$ is defined at the coupler 14 location.

As shown in FIG. 14, the arced simplified path 86*a* may be determined based on the initial position $D_c,\alpha_c$ of coupler 14 relative to vehicle 12 and is presented as a correlated graphical overlay of the arced simplified path 86 on HMI 40 in a similar manner to that which is described above. Similar to the variation of path 86 discussed with respect to FIG. 11, arced paths 86 of varying lengths within a useable distance $D_c$ range of such arced paths 86 corresponding with the maximum steering angle $\delta_{max}$ of vehicle 12 can be stored in memory 62 for presentation, as needed on HMI 42. In an example, the length of path 86*a*, after being initially determined or selected to correspond with the determined angle $\alpha_{max}$ and ending at point 87*a*, can be decreased according to the correlation with the image 43 presented on HMI 40 in increments of, for example, every 0.2 meters or the like until vehicle 12 has rotated (whether directly or not, as the actual path 32 may vary from the simplified path 86*a*) through the angle $\alpha_{max}$ or traversed a distance generally equal to the length of the arced simplified path 86*a*, as initially determined. Accordingly, path images corresponding with such length increments at the above-determined radius $r_{path}$ may be stored in memory 62 for presentation on HMI 40.

As also shown in FIG. 11, once vehicle 12' is in a position where the longitudinal axis 13 of vehicle 12 is aligned within a predetermined threshold (e.g. within about 5°) of an aligned position with respect to coupler 14, the simplified path 86 can transition to a straight line simplified path portion 86*b* that can extend rearward from hitch ball 34' to the general area of coupler 14. In a similar manner to the arced simplified path portion 86*a*, the straight line simplified path portion 86*b* can be presented on HMI 40 in a correlated manner with image 43, as shown in FIG. 13, and may decrease in the depicted length with, for example, every 0.2 meters traversed by vehicle 12 toward coupler 14. In one example, the simplified path image 86*b* can be removed from image 43 when the hitch ball 34 is within 1 meter or the like from coupler 14.

Figure 15:
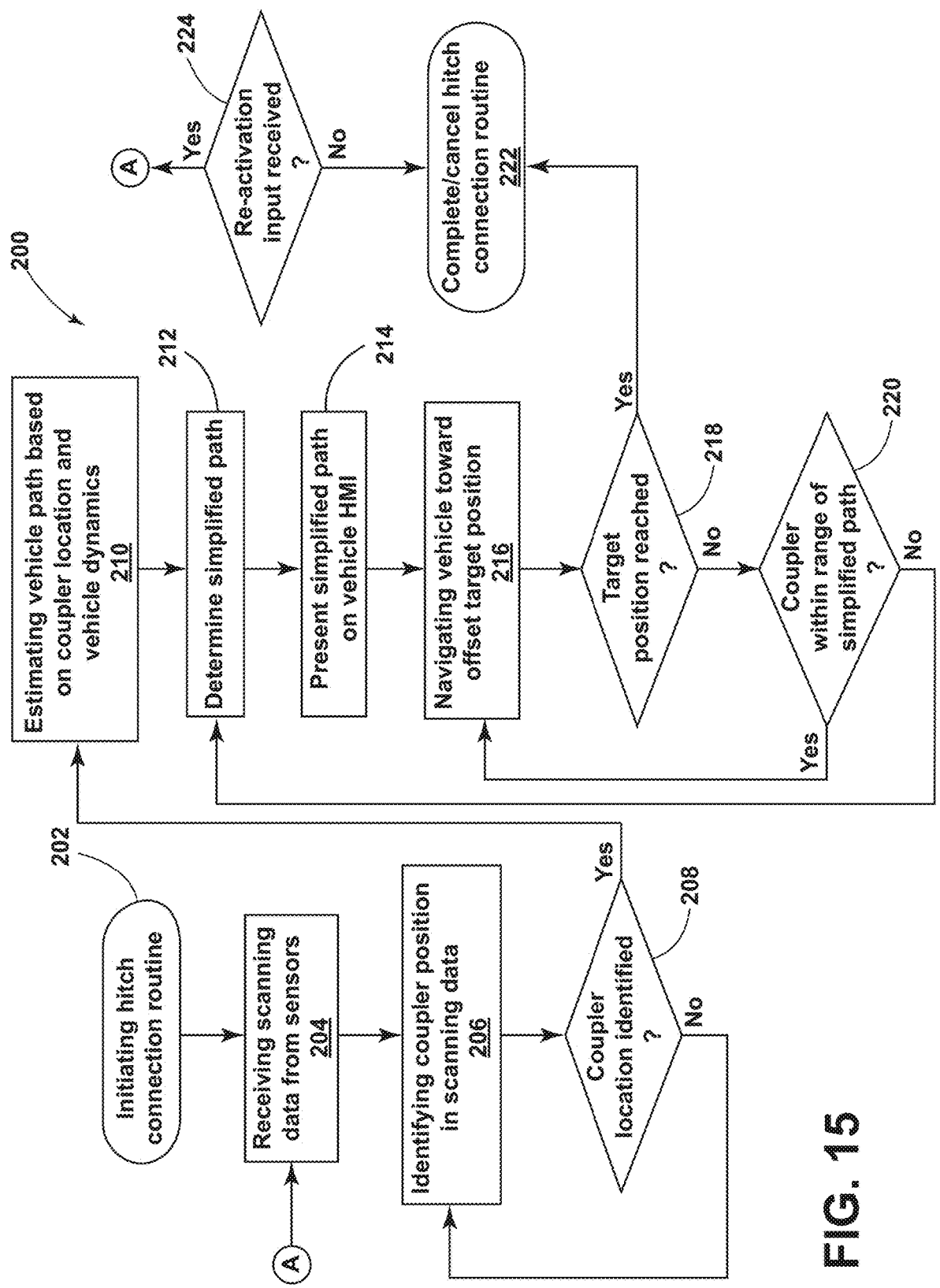
FIG. 15 is a flowchart depicting steps in the alignment sequence.

Turning now to FIG. 15, a flowchart showing steps in one operating scheme 200 for using hitch assist system 10 to align a vehicle hitch ball 34 with a trailer coupler 14 is shown. In particular, in step 202, the hitch assist system 10 is initiated. Once the hitch assist system 10 is initiated 202, controller 26 can use imaging system 18 to scan the viewable scene using any or all available cameras 48, 50, 52*a*, 52*b* (step 204). The scene scan (step 204) can be used to then identify 206 the trailer 16 and coupler 14, which may be confirmed by the user. If the coupler 14 can be identified (step 208) in the image data 55, the height $H_c$ distance $D_c$, and offset angle $\alpha_c$ of coupler 14, as identified in step 206, can then be determined using the available image data 55 (step 206) as discussed above, including using image processing routine 64. As discussed above, image processing routine 64 can be programmed or otherwise configured to identify coupler 14 of trailer 16 within image data 55 (step 206). In this manner, after the results of the initial scene scan (step 204) are analyzed, controller 26 can determine if coupler 14 has been confirmed by the user (such as by way of HMI 40). If coupler 14 has not been confirmed or if a determined coupler 14 has been rejected, the scene scan (step 204) can be continued, including while instructing driver to move vehicle 12 to better align with trailer 16, including by positioning the trailer 16 and/or coupler 14 until coupler 14 is identified.

When coupler 14 has been identified and confirmed, the path derivation routine 66 can be used to determine the vehicle path 32 to align hitch ball 34 with coupler 14 in step 210. In this manner, the positioning $D_h$, $\alpha_h$ of coupler 14 is extracted from the image data 55 and used to place the coupler 14 within the stored data relating the image coordinates with the real-world coordinates of the area surrounding vehicle 12. In doing so, controller 26 uses path derivation routine 66 to determine path 32 to align hitch ball 34 with the predicted position 28 of coupler 14 to an engaging position over hitch ball 34, as described above with respect to FIGS. 1-9. Once the actual planned path 32 has been derived, path derivation routine 66 can also derive the simplified path 86 (step 212) and present the simplified path on display 42 (step 214), as discussed above with respect to FIGS. 3-6, FIGS. 13 and 14, or as would otherwise be understood based on the above description.

Once the path 32 and simplified path 86 have been derived, hitch assist system 10 can ask the user U to relinquish control of at least the steering wheel of vehicle 12 (and, optionally, the throttle 73 and brake, in the implementation of hitch assist system 10 described above wherein controller 26 assumes control of powertrain control system 72 and brake control system 70 during execution of operating routine 68). When it has been confirmed that user U is not attempting to control steering system 20 (for example, using torque sensor 80, as discussed above), controller 26 begins to move vehicle 12 along the determined path 32. Hitch assist system 10 then controls steering system 20 (step 216) to maintain vehicle 12 along path 32 as either user U or controller 26 controls the velocity of vehicle 12 using powertrain control system 72 and braking control system 70. As discussed above, controller 26 can control at least steering system 20, while tracking the position $D_c$, $\alpha_c$ of coupler 14 to back vehicle 12 and can continue such backing until it has been determined that the desired position has been reached (step 218). As vehicle 12 reverses under control of system 10, the tracked position of coupler 14 can be compared with the simplified path 86 derived in step 212 to determine if the coupler 14 is within an acceptable range of the simplified path 86, including the end circle 87 thereof (step 220). If the coupler 14 is still within the desired range of simplified path 86, system 10 continues navigating vehicle 12 along path 32 (step 216). If coupler 14 is not within the desired range of simplified path 86, a new simplified path can be generated (step 212) and presented on the image 43 on screen 42 (step 214). As discussed above, at time or distance interval can be used in a similar method in place of the described range monitoring.

When vehicle 12 reaches a position (as determined in step 220), wherein the vehicle 12 hitch ball 34 reaches the desired position 38$_d$ for the desired alignment with coupler 14, at which point operating routine 68 can end (step 222), either by controlling brake system 70 to cause vehicle 12 to stop (which can be done progressively as vehicle 12 approaches such a point), or by issuing a command to the user to stop vehicle 12 (which can also be done progressively or by a countdown as vehicle 12 approaches the desired location) before deactivating hitch assist system 10 (step 222). Vehicle 12 can then be driven normally with system 10 remains idle until a reactivation input (step 224) is received, at which point the above-described method restarts at the scanning step 204.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle hitching assistance system, comprising:
a human-machine interface including a video screen; and
a controller:
   acquiring image data from the vehicle;
   deriving a vehicle path to control the vehicle in approaching a trailer for vertical alignment of a hitch ball of the vehicle with a trailer coupler initially spaced from the vehicle, unhitched from the hitch ball, and identified within the image data, the vehicle path including a set of path segments defining respective curvatures in opposite directions;
   outputting a video image, including a representation of a simplified path from the hitch ball to the coupler, to the video screen for display thereon, the simplified path including only one segment selected from the path segment set; and
   outputting a steering signal to cause the vehicle to steer along the vehicle path.

2. The system of claim 1, wherein the simplified path approximates a theoretical turn radius of the vehicle at the hitch ball, is selected from the path segment set.

3. The system of claim 1, wherein the simplified path is derived as an arced path between a current hitch ball position and a current coupler position.

4. The system of claim 3, wherein the arced path:
is defined by a backing trajectory of the hitch ball at theoretical radius turn; and
is centered about a theoretical turn center of the vehicle for the theoretical constant radius.

5. The system of claim 1, wherein:
the video image output by the controller further includes at least a portion of the image data with the representation of the simplified path overlaid on the image data; and
the video image is output to the human-machine interface for display thereon.

6. The system of claim 1, wherein:
the controller further:
   derives the simplified path at an initial state; and
   updates the simplified path at least one subsequent state; and
the representation of the simplified path included in the video image corresponds with a most recent state, at least by having an updated curvature that is different from an initial curvature corresponding with the initial state.

7. The system of claim 6, wherein:
the simplified path derived at the initial state is an arced path; and
the simplified path derived at the at least one subsequent state is a straight line path.

8. The system of claim 1, wherein the controller acquires the image data from an imaging system included with the vehicle, the imaging system having at least one camera.

9. The system of claim 1, wherein:
the controller outputs the steering signal to a steering system included with the vehicle; and
the controller derives the steering signal based on at least a maximum steering angle of the steering system.

10. A vehicle, comprising:
a steering system;
a human-machine interface including a video screen; and
a controller:
   acquiring image data from the vehicle;
   deriving a vehicle path to control the vehicle in approaching a trailer for vertical alignment of a hitch ball of the vehicle with a trailer coupler initially spaced from the vehicle, unhitched from the hitch ball, and identified within the image data;
   deriving a simplified path from the hitch ball to the coupler at an initial state;
   outputting a video image, including a representation of a simplified path, to the video screen for display thereon;
   outputting a steering signal to the steering system to steer along the vehicle path;
   updating the simplified path in at least one subsequent state while steering along the vehicle path, wherein the representation of the simplified path included in the video image corresponds with a most recent state, at least by having an updated curvature that is different from an initial curvature corresponding with the initial state.

11. The vehicle of claim 10, wherein:
the vehicle path includes a set of path segments defining respective curvatures in opposite directions in at least the initial state; and
the simplified path includes only one segment having a curvature in a single direction; and
the simplified path approximates the theoretical turn radius at the hitch ball and is selected from the path segment set, at least in the initial state.

12. The vehicle of claim 10, wherein:
the simplified path is derived as an arced path between a current hitch ball position and a current coupler position; and
the arced path:
   is defined by a backing trajectory of the hitch ball at a theoretical constant radius turn; and
   is centered about a theoretical turn center of the vehicle for the theoretical constant radius.

13. The vehicle of claim 10, wherein:
the video image output by the controller further includes at least a portion of the image data with the representation of the simplified path overlaid on the image data; and
the video image is output to the human-machine interface for display thereon.

14. The vehicle of claim 10, further including an imaging system including at least one exterior camera, wherein:
the controller acquires the image data from an imaging system included with the vehicle, the imaging system having at least one camera.

15. The vehicle of claim 10, wherein the simplified path is derived in at least the initial state as a straight line path between a current hitch ball position and a current coupler position.

16. The vehicle of claim 10, wherein the video screen is included in a remote device external to the vehicle.

17. A method for assisting a vehicle in hitching with a trailer, comprising:
acquiring image data from the vehicle;
deriving a vehicle path to control the vehicle in approaching a trailer for vertical alignment of a hitch ball of the vehicle with a trailer coupler initially spaced from the vehicle, unhitched from the hitch ball, and identified within the image data;
deriving a simplified path from the hitch ball to the coupler at an initial state;
outputting a video image, including a representation of a simplified path, to a video screen for display thereon;
causing the vehicle to steer along the vehicle path;
updating the simplified path in at least one subsequent state while causing the vehicle to steer along the vehicle path, wherein the representation of the simplified path included in the video image corresponds with a most recent state, at least by having an updated curvature that is different from an initial curvature corresponding with the initial state.

18. The method of claim 17, wherein:
the vehicle path includes a set of path segments defining respective curvatures in opposite directions; and
the simplified path includes only one segment having a curvature in a single direction;
the simplified path, which approximates the theoretical turn radius at the hitch ball, is selected from the path segment set.

19. The method of claim 17, wherein:
the simplified path is derived as an arced path between a current hitch ball position and a current coupler position; and
the arced path:
is defined by a backing trajectory of the hitch ball at a theoretical constant radius turn; and
is centered about a theoretical turn center of the vehicle for the theoretical constant radius.

20. The method of claim 19, wherein the simplified path is derived in at least the initial state as a straight line path between a current hitch ball position and a current coupler position.

* * * * *